INVENTORS
WILLIAM A. CAWLEY &
GIBSON T. HUTCHISON
BY
ATTORNEYS

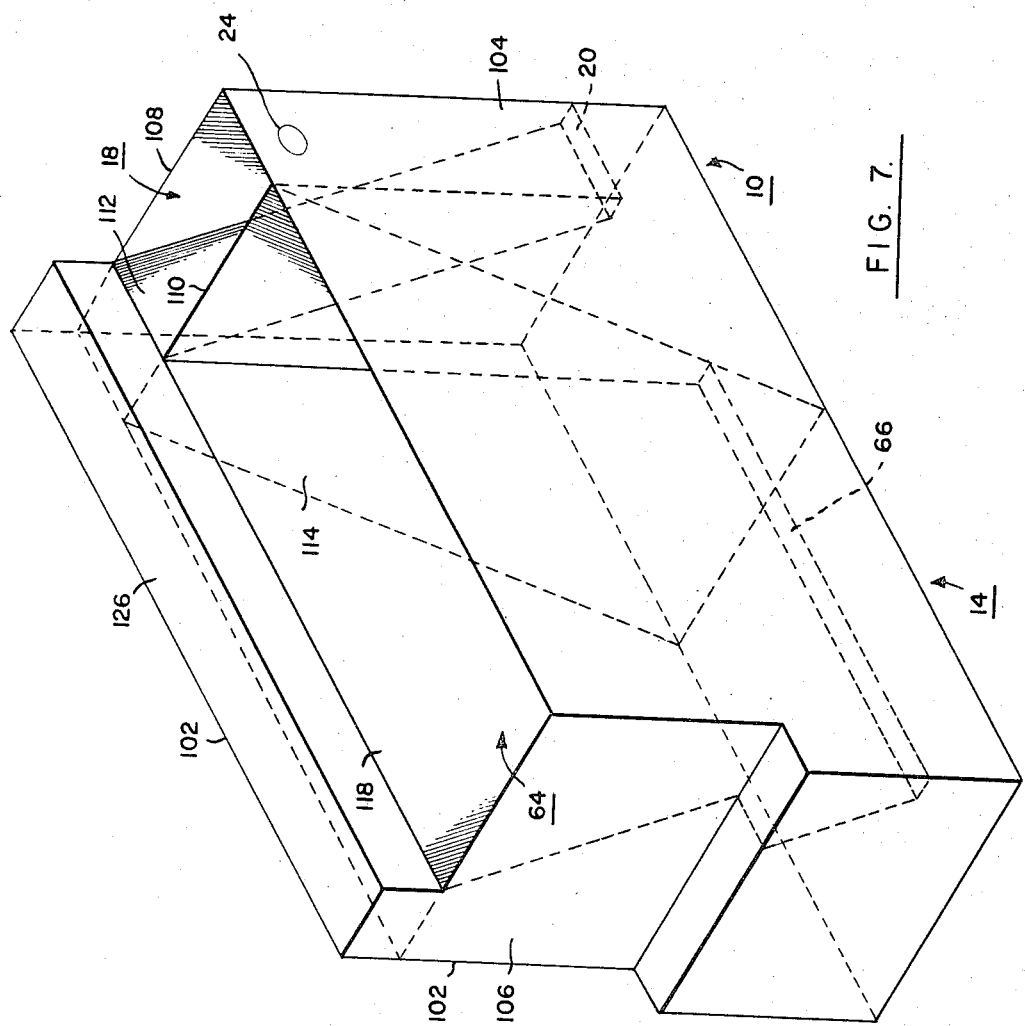

United States Patent Office 3,335,865
Patented Aug. 15, 1967

3,335,865
SYSTEM FOR SEWAGE TREATMENT
William A. Cawley, King of Prussia, and Gibson T. Hutchison, Maple Glen, Pa., assignors to Crane Co., Chicago, Ill., a corporation of Illinois
Filed Aug. 18, 1964, Ser. No. 390,361
11 Claims. (Cl. 210—110)

This invention relates to the treatment of sewage, this term being used herein to include wastes, industrial or otherwise, adapted to purification by biochemical treatment, and is designed particularly for the purification of shipboard sewage before discharge overboard.

The general object of the present invention is to provide a system for the treatment of sewage which combines, in a minimum possible space, the advantages of both the so-called trickling filter and the extended aeration sewage treatment processes. The trickling filter, which is essentially a biological oxidizer tower, has the advantages of operational stability and simplicity. The extended aeration apparatus has very effective sludge destruction abilities. Accordingly, a sewage treatment system combining the advantages of both the trickling filter and the extended aeration sewage treatment processes while taking up a minimum of space will be highly advantageous particularly for use in shipboard service.

The above and other objects and features of the invention relating more particularly to details of construction and operation will become apparent from the following description when read with reference to the accompanying drawings, in which:

FIGURE 7 is a perspective view illustrating a detail of the invention.

Figure 1:
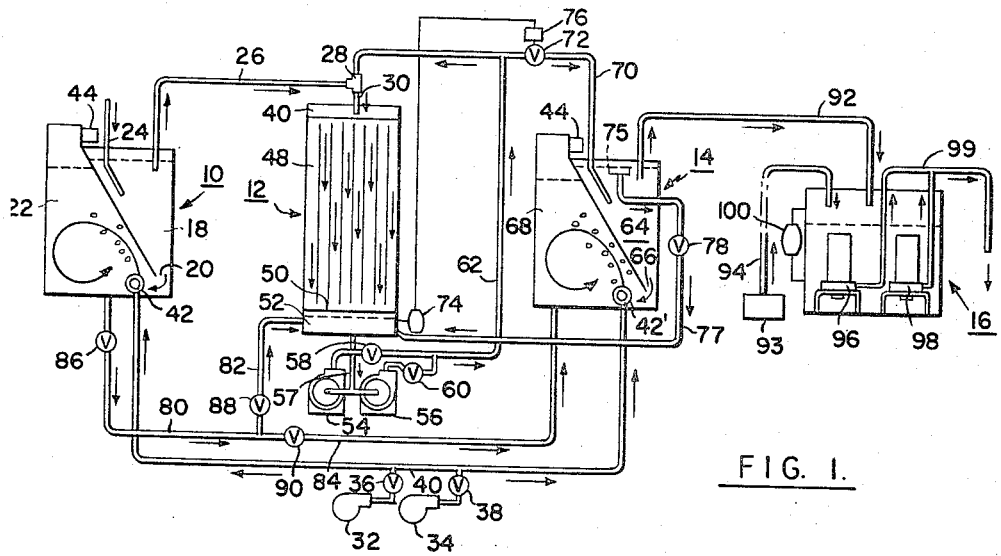
FIGURE 1 is a schematic flow diagram of a sewage treatment system in accordance with this invention.

Referring to FIGURE 1, the sewage treatment system in accordance with this invention comprises four basic components, a first Imhoff type of settling tank 10, a biological oxidizer tower 12, a second Imhoff type settling tank 14 and an overboard tank 16. Imhoff tanks are, of course, well known, these tanks comprising two compartments, a settling or clarifier compartment and a digester compartment. Prior Imhoff tank constructions involve a two-story arrangement with the upper portion being a V-shaped trough and serving as a settling basin wherein solid material settles out through a slot at the bottom thereof into a sludge sump in a lower compartment. The solid matter which settles into the lower compartment is digested and decomposed therein with the gases formed by this action being led to the surface of the tank. While the Imhoff type tanks 10 and 14 employed in the system in accordance with this invention are generally similar to prior constructions, they have a novel construction and arrangement which will be described fully hereafter.

The tank 10 comprises a clarifier compartment 18 having a trough-like bottom provided with a sludge slot 20 which communicates with a digester compartment 22. The compartments 18 and 22 may be termed the primary clarifier and the primary digester, respectively. Sewage, after being comminuted, is delivered to the clarifier 19 by way of inlet 24. The heavier sludge particles settle out of the sewage and pass automatically and continuously into the digester 22. The supernatent or clear liquid is transferred from the outlet of the primary clarifier 18 by line 26 to the suction of an eductor 28 the outlet of which is connected to the biological oxidizer tower 12 by a line 30. Air is delivered to the primary digester 22 by means of a pair of blowers 32 and 34 which discharge through valves 36 and 38, respectively, into a line 40 which is connected to a pipe 42 extending horizontally across the lower portion of the digester compartment 22. Pipe 42 has a plurality of holes in the upper portion thereof spaced longitudinally for distributing the air throughout the compartment. The air serves to agitate the sludge in the digester 22 and serves to provide the oxygen requirements. The air and the gases formed in the sludge compartment escape therefrom by way of a venting means 44 located at the top of the digester compartment. The venting means is also provided with means for collecting foam and separating it from the exit air and returning it to the primary digester 22. This serves to raise the concentration of the foaming materials in the digester to optimize their degradation. This latter means comprises a liquid spray which serves as a foam suppressor and a return arrangement to be descirbed more fully hereafter. It will be evident that various methods of foam separation and recycling may be used and it is not desired to be limited to the specific form disclosed herein.

The so-called trickling filter or biological oxidizer tower 12 may be of any suitable type and includes a top portion which forms a distribution box 46 spreading the effluent from the line 30 across the cross-sectional area of the filtering portion 48 therebeneath. The filtering portion 48 may contain as the filtering packing or medium various materials such as stone, corrugated or granular polyvinyl chloride, polystyrene or polyvinylidene chloride, paper, asbestos, or the like, the packing being of a type exposing the sewage to oxygen to promote biochemical action as usual. The effluent from the eductor 28 flows from the distribution box downwardly through the filtering medium and trickles through a porous packing-retaining member 50 forming the bottom of the filter into a collection sump 52 at the bottom of the tower.

Means are provided for recirculating the liquid through the tower. To this end, there are provided a pair of recirculation pumps 54 and 56 the inlets 57 of which communicate with the sump 52. The outlets of the pumps 54 and 56 are connected through valves 58 and 60 to a recirculating line 62 which is connected to the inlet of the eductor 28. Accordingly, sewage may be pumped from the sump 52 to the top of the tower 12 for recycling therethrough.

The second Imhoff type tank 14 is constructed similarly to the tank 10 and comprises a clarifier compartment 64 having a trough-like bottom provided with a sludge slot 66 which communicates with the digester compartment 68. The compartments 64 and 68 may be termed the secondary clarifier and the secondary digester, respectively.

Means are provided for delivering the sewage treated in the tower 12 to the secondary clarifier 64 when the level of the sump 52 reaches a predetermined point. Such means comprises a bypass line 70 connected between the recirculation line 62 and the clarifier compartment 64 and a control valve 72 connected in this bypass line. The valve 72 is level controlled in response to the level in the sump 52 by means of a level responsive means 74 connected to a control means 76 which actuates the valve 72 between open and closed positions. The level responsive means 74 and the control means 76 may be of any suitable type which operate to open a valve in response to the sensing of a predetermined upper level and to close the valve in response to the sensing of a predetermined lower level. Such means are well known in the art and need not be described herein.

Air is delivered to the secondary digester 68 by the blowers 32 and 34 by way of line 40 and a portion 42' of the perforated pipe 42 in the lower portion of the digester compartment. A scum collector tray 75 is provided at the top of the secondary clarifier compartment 64 and is connected by a line 77 and the control valve 78 to the sump 52 of the tower 12. By this arrangement scum may be returned to the tower 12 for treatment. There are provided a plurality of draining and filling lines 80, 82 and 84 having control valves 86, 88 and 90 therein.

The supernatent liquid from the secondary clarifier 64 is delivered from its outlet by an overflow 92 to the overboard tank 16 in which the clear liquid is chlorinated before being discharged. Chlorine gas is delivered from a chlorinator 93 to the tank 16 by the way of a line 94. A pair of level controlled pumps 96 and 98 are provided for discharging the liquid from the tank 16 overboard through line 99. The arrangement is such that either discharge pump may be removed while the other pump is in operation. A level control means 100 is provided for controlling operation of the pumps 96 and 98. This control means 100 is responsive to an upper level to effect pumping operation and to a lower level for terminating pumping operation as is well known in the art. The overboard tank arrangement is well known per se wherefore further description thereof is not necessary.

In the operation of the sewage treatment system shown in FIGURE 1, sewage, after being comminuted, is delivered through inlet 24 to the primary clarifier 18. The heavier solids are separated and settle into the primary digester 22 where they are aerated. The supernatent liquid from the primary clarifier 18 is transferred to the biological oxidizer tower 12 by means of the eductor 28. The sewage then trickles downwardly through the tower 12 to the collection sump 52 at the bottom thereof. So long as the level at the sump 52 is below a predetermined upper level, the sewage is recirculated through the biological oxider tower 12 by pumps 54 and/or 56. When the level in the sump reaches the predetermined upper level, this is sensed by the level control means 74 which operates to open the control valve 72 to thereby open the bypass line 70 to the secondary clarifier 64. The control valve 72 is constructed to regulate flow through the bypass line 70 so that some of the treated sewage being recirculated through the tower 12 passes through line 70 to the secondary clarifier.

It will be noted that the control responsive to the level in the sump 52 not only serves to control the flow from the tower 12 to the secondary clarifier but also serves to control the flow from the primary clarifier to the tower. This control occurs because of the arrangement involving the eductor 28, the eductor drawing more or less liquid from the clarifier 18 in accordance with the pressure drop thereacross provided by the flow therethrough. Thus, when liquid is bypassed from line 62 to the secondary clarifier, the flow through and pressure drop across the eductor 28 will be decreased wherefore less liquid will be drawn through the suction line 26. Of course, the flow is greater through line 26 when the valve 72 is closed because there is a greater flow through and pressure drop across the eductor 28. It is noted that only sewage which has been recirculated for a considerable period of time will be bypassed since liquid inflow will be stopped once bypass flow occurs. Moreover, the use of the eductor serves to provide an additional point of introduction of air into the system.

The sewage in the secondary clarifier settles with the solid fraction flowing into the secondary aerobic digester 68 where a digesting action takes place. The supernatent liquid from the secondary clarifier overflows into the overboard tank 16 where it is chlorinated by the chlorine gas applied through line 94. The chlorinated sewage is discharged from the overboard tank 16 by the pumps which are controlled by the level control 100. In the case of shipboard operation this discharge would be overboard.

In the operation of the system, the residence time in both the primary and secondary aerobic digesters and the air supply are sufficient to reduce the volume of the solids and to bring about aerobic digestion thereof. In operation, the incoming sludge will displace the mixed liquor in the digester back into the settling section with the heavier solids resettling for further digestion while the material which has been digested to the point where it is too light to settle will pass out of the settling tank.

FIGURES 2 to 7 disclose various details of construction of an actual form of the system shown schematically in FIGURE 1. As shown in the plan view of FIGURE 2, the entire system is constructed and arranged to be contained within a substantially square structure. The two Imhoff type of tanks 10 and 14 take up approximately the rear half of the structure and the biological oxidizer tower 12 and overboard tank 16 take up the front half of the structure. The various pumps, valves, lines and the like are located conveniently and within the overall square structure as will be described hereafter. The overboard tank 16 is located in the right front corner as viewed in FIGURE 2.

Figure 2:
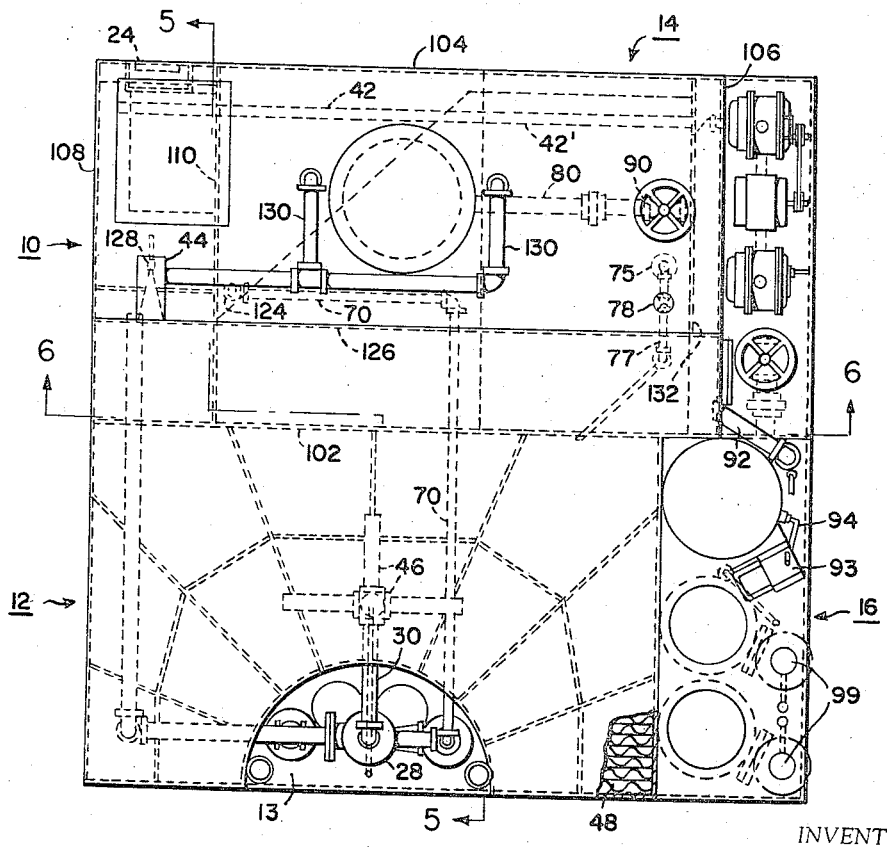
FIGURE 2 is a plan view of the sewage treatment system in accordance with this invention.
Figure 5:
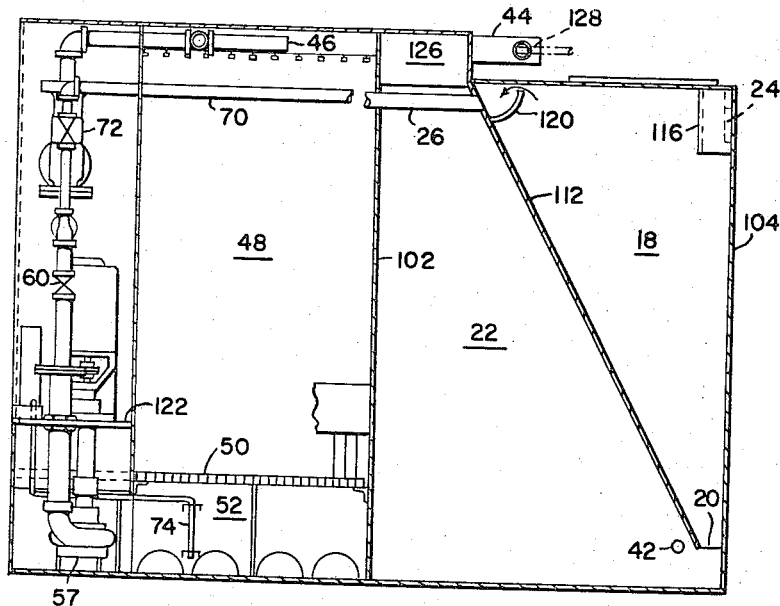
FIGURE 5 is a section taken on line 5—5 of FIGURE 2.
Figure 6:
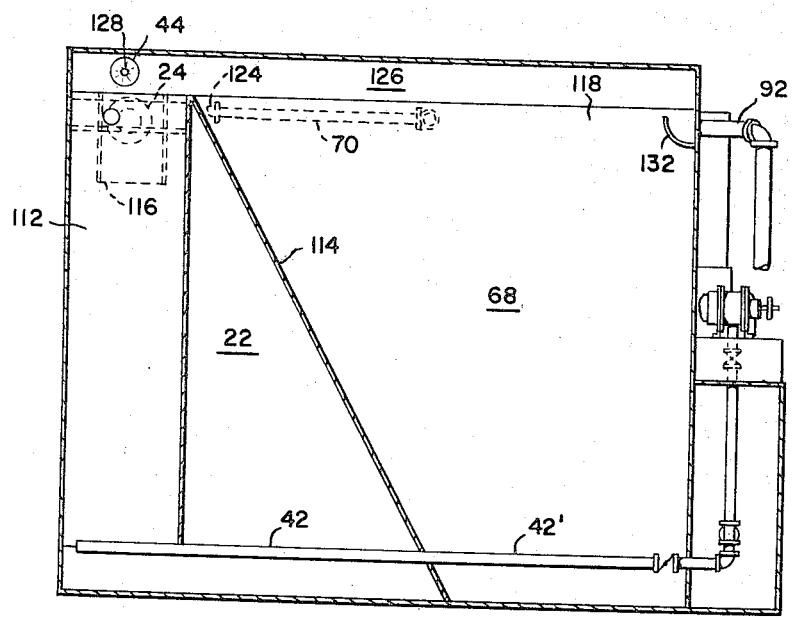
FIGURE 6 is a section taken on line 6—6 of FIGURE 2.

A feature of the invention is the arrangement of the two tanks 10 and 14 so as to take up a minimum of space. This arrangement is illustrated in isometric form in FIGURE 7. For purposes of orientation, the front wall 102 and the rear wall 104 of the dual tank arrangement can be seen in both FIGURE 2 and FIGURE 7. The right and left walls of the tank structure as viewed in FIGURE 2 are indicated at 106 and 108, respectively. The primary clarifier compartment 18 of the primary tank 10 is defined by a portion of the walls 104 and 108, a vertically extending wall 110 parallel to wall 108 and an inclined wall 112 defining the trough construction of the primary tank 10. The sludge slot 20 is shown at the bottom of the clarifier compartment 18. An inclined wall 114 extending across the tank construction serves as a dividing wall between the first tank 10 and the second tank 14. The digester portion of the first tank 10 is contained beneath the two inclined walls 112 and 114 and between portions of the walls 102 and 108 as is best indicated in FIGURES 5, 6 and 7. The inlet 24 communicates with the primary clarifier 18 and is blocked by the usual baffle 116.

The secondary clarifier 64 is defined by an inclined wall 118 extending between wall 114 and wall 106 in cooperation with portions of walls 104, 106 and 114 as is best shown in FIGURE 7. The sludge slot 66 is provided at the bottom of wall 118 and communicates with the secondary digester 68 which is located beneath the inclined wall 118 and between the walls 102, 106 and 114.

It is thus apparent that the arrangement discussed above is very compact and takes up a minimum of space. Moreover, a feature of the arrangement of tanks 10 and 14 is that the digester portion is at the same elevation as the settling compartment as compared with prior Imhoff type tanks which involve a two-story arrangement as discussed above. The present construction takes a minimum of height and is made possible by the use of air introduced for aerobic digestion adjacent the sludge slot to assist transfer of sludge from the clarifier to the digester.

Figure 3:
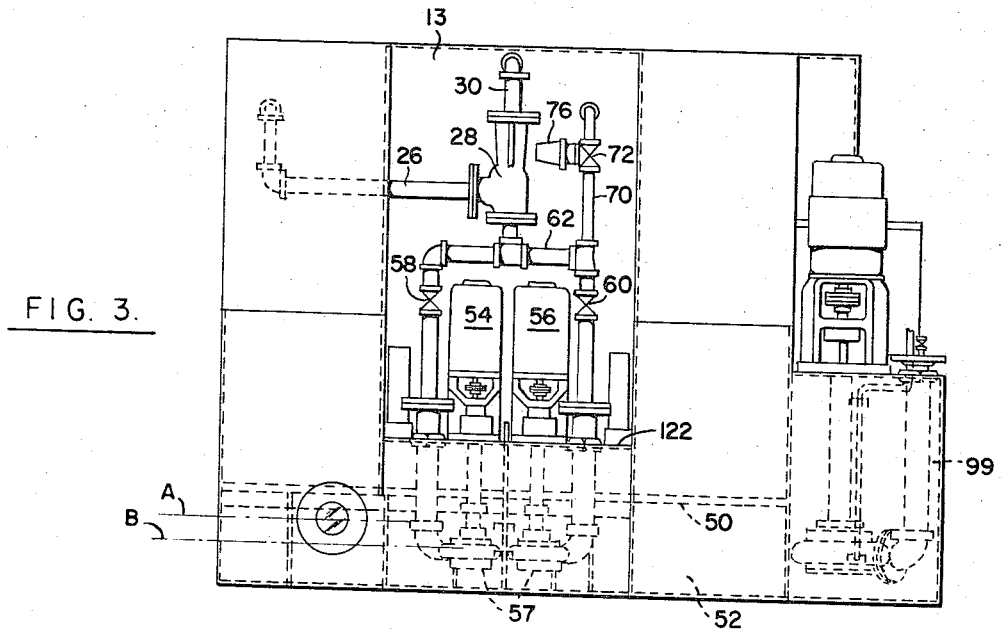
FIGURE 3 is a front elevational of the apparatus shown in FIGURE 2.

As best shown in FIGURE 5, the flow from the primary clarifier 18 to the oxidizer tower 12 is over a weir 120 to the line 26 which, as is best shown in FIGURE 3, is connected to the suction of the eductor 28. The outlet of the eductor 28 is connected through line 30 to the distribution box 46 of the oxidizer tower 12 as is best shown in FIGURES 2 and 3.

As shown in FIGURE 2, the biological oxidizer tower 12 comprises a packing 48 arranged in a plurality of compartments or cells and comprising a corrugated construction. The tower 12 has a semi-circular recess 13 fromed in the front end thereof for accommodating various components of the pumps 54 and 56, the eductor 28, and various valves and lines as is best shown in FIGURES 2 and 3. These last-mentioned itmes are supported on a base 122 positioned above a portion of the sump 52 of the tower 12. This arrangement achieves a maximum aerating surface while taking up a minimum of space and providing for a minimum of piping. As best shown in FIGURE 5, the packing 48 is mounted above the grating 50 and communicates therethrough with the sump 52 at the bottom of the tower 12.

Figure 4:
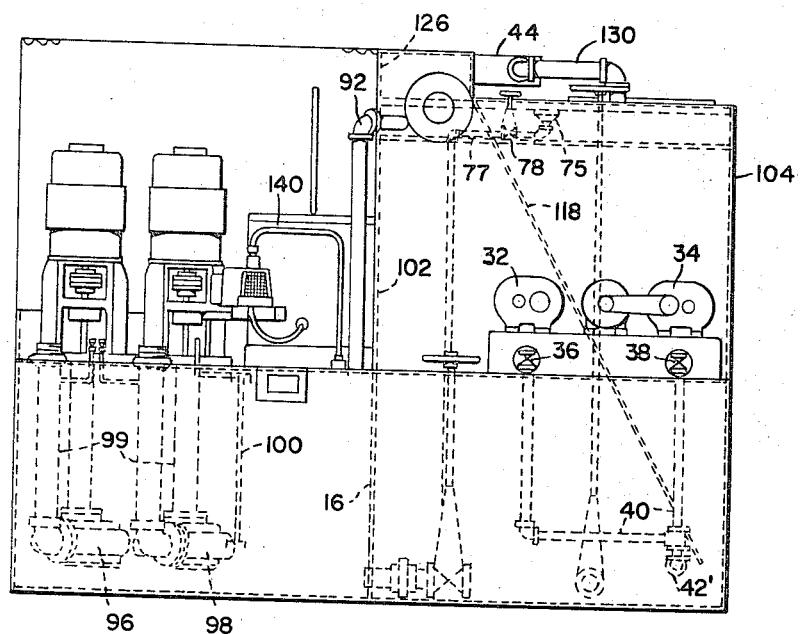
FIGURE 4 is a right elevation of the apparatus shown in FIGURE 2.

The recirculation line 62 is shown best in FIGURE 3 along with the valves 58, 60 and the various piping connections. The bypass arrangement, including line 70 and valve 72, for delivering sewage from the recirculating line 62 to the secondary clarifier 64 is best shown in FIGURES 2 and 3. The inlet to the secondary clarifier being indicated at 124. The two blowers 34 and 32 for supplying air to the digesters are mounted adjacent the right side of the Imhoff tank construction and deliver air through line 40 to a pipe 42 which extends across the back of the construction parallel to wall 104 as is shown in FIGURES 2 and 4. The pipe 42 has a portion 42' which extends within the primary digester.

The gases formed in the digesters 22 and 68 pass to the top thereof to a transversely extending duct 126. It will be noted that the duct 126 communicates with both the digesters. The duct 126 is vented at 44 at the left end thereof at a chamber above the primary digester 22. In operation, rising gas bubbles in the digester cause the formation of foam which contains sludge particles and can rise to the top of the digester. Means are provided at the vent 44 for seperating the foam from the exit air and returning this foam to the primary digester. Such means comprises a liquid spraying device 128. The spray device 128 sprays water across the vent 44 to thereby return the foam to the primary digester therebeneath. In this arrangement, only the air and other gases escape from the digester, the foam being contacted by a liquid spray and returned to the primary digester to raise the concentration of foaming materials therein and optimize their degradation. Of course, other types of foam separators may be used.

The primary and secondary clarifiers are also connected to the vent 44 by venting lines 130.

The overflow 92 for the flow of supernatent liquid from the secondary clarifier 64 to the overboard tank 16 is best shown in FIGURES 2, 4 and 6. It will be noted that the outlet for secondary clarifier 64 is over a weir 132 and the clarifier outlet is above the overboard tank 16 whereby gravity flow exists. The motors for operating the overboard pumps 96 and 98 are mounted above the overboard tank 16 as is shown in FIGURES 2, 3 and 4. Suitable disinfectant is fed to the overboard tank from a storage tank 140 containing such disinfectant. The scum collector tray 75 and the connection therefrom to the sump 52 are best shown in FIGURES 2 and 4. The drain between the primary and secondary digesters is best shown in FIGURE 2 which illustrates line 80 and valve 90, this drain comprising a pipe extending through the bottom portion of the inclined wall 114 and a manual means for operating the valve from above.

The upper and lower levels serving as the control for operation of the bypass from the tower 12 to the secondary clarifier are indicated by lines A and B in FIGURE 3. The level control means 100 for controlling the overboard pumps is best shown in FIGURE 4.

It will be apparent that various modifications of the apparatus in operation in accordance with the invention may be made without departing from the scope of the invention wherefore it is not desired to be limited except as required by the following claims.

What is claimed is:

1. A sewage purification system comprising a primary Imhoff type of tank having a clarifier compartment adapted to receive the sewage to be purified, a digester compartment, and a sludge slot at the bottom of the clarifier compartment through which solids which settle to the bottom of the clarifier compartment pass to the digester compartment, a biological oxidizer tower having an inlet at the top thereof and a collection sump at the bottom thereof, a secondary Imhoff type of tank having a clarifier compartment, a digester compartment, and a sludge slot at the bottom of the clarifier compartment through which solids which settle to the bottom of the clarifier compartment pass into the digester compartment, conduit means for directing the flow of supernatent liquid from the primary clarifier compartment to the inlet of the biological oxidizer tower, means for recirculating liquid from the sump of the tower to the inlet thereof, means for bypassing liquid from said recirculating means to the secondary clarifier compartment, and means for controlling flow through said bypass means including a valve in said bypass and means responsive to a predetermined upper level in said sump for opening said valve and responsive to a predetermined lower level in said sump for closing said valve.

2. A sewage purification system comprising a primary Imhoff type of tank having a clarifier compartment adapted to receive the sewage to be purified, a digester compartment, and a sludge slot at the bottom of the clarifier compartment through which solids which settle to the bottom of the clarifier compartment pass to the digester compartment, a biological oxidizer tower having an inlet at the top thereof and a collection sump at the bottom thereof, a secondary Imhoff type of tank having a clarifier compartment, a digester compartment, and a sludge slot at the bottom of the clarifier compartment through which solids which settle to the bottom of the clarifier compartment pass into the digester compartment, means for conducting fluid from said biological oxidizer tower to the inlet of said secondary clarifier compartment, an eductor the outlet of which is connected to the inlet of the biological oxidizer tower, means for recirculating liquid from the sump to the inlet of the eductor and conduit means connecting the suction of the eductor to the primary clarifier compartment for directing the flow of supernatant liquid therefrom to the inlet of the biological oxidizer tower.

3. A sewage purification system according to claim 2 including means for bypassing said recirculating means to the inlet of the secondary clarifier compartment and means for opening said bypass in response to a predetermined upper level in said sump and for closing said bypass in response to a predetermined lower level in said sump.

4. A sewage purification tank construction comprising means defining a generally rectangular tank including a front, a rear and a pair of side vertical walls, an intermediate wall extending parallel to said side walls, a primary Imhoff tank having a setting compartment defined by a portion of said rear wall, a portion of one of said side walls, a portion of said intermediate wall and an inclined wall extending between said one side wall and said intermediate wall, and a digester compartment on the opposite side of said inclined wall adjacent said settling compartment and at the same elevation thereof, a second inclined wall extending between the front and rear walls to divide said rectangular tank, said primary Imhoff tank being contained on one side of said second inclined wall, and a secondary Imhoff tank on the opposite side of said second inclined wall.

5. A sewage purification tank construction according to claim 4 wherein said secondary Imhoff tank comprises a settling compartment defined by a portion of said rear wall, a portion of the other of said pair of side walls, a portion of said second inclined wall and a third inclined wall extending between said other side wall and said dividing wall, and a secondary digester compartment on the opposite side of said third inclined wall and at the same elevation as said secondary settling compartment.

6. A sewage purification system comprising a primary Imhoff type of tank having a clarifier compartment adapted to receive the sewage to be purified, a digester compartment, and a sludge slot at the bottom of the clarifier compartment through which solids which settle to the bottom of the clarifier compartment pass to the digester compartment, a biological oxidizer tower having an inlet at the top thereof and a collection sump at the bottom thereof, a secondary Imhoff type of tank having a clarifier compartment, a digester compartment, and a sludge slot at the bottom of the clarifier compartment through which solids which settle to the bottom of the clarifier compartment pass into the digester compartment, conduit means for directing the flow of supernatent liquid from the primary clarifier compartment to the inlet of the biological oxidizer tower, conduit means for directing the flow of sewage from the sump of the tower to the secondary clarifier compartment, conduit means for discharging the supernatent liquid from said secondary clarifier compartment and means for delivering air to the primary digester compartment for effecting aerobic digestion therein.

7. A sewage purification system according to claim 6 wherein said air delivery means is arranged to inject the air into said primary digester compartment in the vicinity of said sludge slot for said primary Imhoff type of tank to thereby assist the transfer of settling solids from the clarifier to the digester compartment of said primary tank.

8. A sewage purification system comprising a primary Imhoff type of tank having a clarifier compartment adapted to receive the sewage to be purified, a digester compartment, and a sludge slot at the bottom of the clarifier compartment through which solids which settle to the bottom of the clarifier compartment pass to the digester compartment, a biological oxidizer tower having an inlet at the top thereof and a collection sump at the bottom thereof, a secondary Imhoff type of tank having a clarifier compartment, a digester compartment, and a sludge slot at the bottom of the clarifier compartment through which solids which settle to the bottom of the clarifier compartment pass into the digester compartment, conduit means for directing the flow of supernatent liquid from the primary clarifier compartment to the inlet of the biological oxidizer tower, conduit means for directing the flow of sewage from the sump of the tower to the secondary clarifier compartment, conduit means for discharging the supernatent liquid from said secondary clarifier compartment and means for delivering air to the primary and secondary digester compartments for effecting aerobic digestion therein.

9. A sewage purification system comprising a primary Imhoff type of tank having a clarifier compartment adapted to receive the sewage to be purified, a digester compartment, and a sludge slot at the bottom of the clarifier compartment through which solids which settle to the bottom of the clarifier compartment pass to the digester compartment, a biological oxidizer tower having an inlet at the top thereof and a collection sump at the bottom thereof, a secondary Imhoff type of tank having a clarifier compartment, a digester compartment, and a sludge slot at the bottom of the clarifier compartment through which solids which settle to the bottom of the clarifier compartment pass into the digester compartment, said clarifier compartment and said digester compartment of said primary Imhoff type of tank being at the same elevation, conduit means for directing the flow of supernatent liquid from the primary clarifier compartment to the inlet of the biological oxidizer tower, conduit means for directing the flow of sewage from the sump of the tower to the secondary clarifier compartment, and conduit means for discharging the supernatent liquid from secondary clarifier compartment.

10. A sewage purification system comprising a primary Imhoff type of tank having a clarifier compartment adapted to receive the sewage to be purified, a digester compartment, and a sludge slot at the bottom of the clarifier compartment through which solids which settle to the bottom of the clarifier compartment pass to the digester compartment, a biological oxidizer tower having an inlet at the top thereof and a collection sump at the bottom thereof, a secondary Imhoff type of tank having a clarifier compartment, a digester compartment, and a sludge slot at the bottom of the clarifier compartment through which solids which settle to the bottom of the clarifier compartment pass into the digester compartment, said clarifier compartment and said digester compartment of each of said primary and secondary Imhoff type of tanks being at the same elevation, conduit means for directing the flow of supernatent liquid from the primary clarifier compartment to the inlet of the biological oxidizer tower, conduit means for directing the flow of sewage from the sump of the tower to the secondary clarifier compartment, and conduit means for discharging the supernatent liquid from said secondary clarifier compartment.

11. A sewage purification system comprising a primary Imhoff type of tank having a clarifier compartment adapted to receive the sewage to be purified, a digester compartment, and a sludge slot at the bottom of the clarifier compartment through which solids which settle to the bottom of the clarifier compartment pass to the digester compartment, a biological oxidizer tower having an inlet at the top thereof and a collection sump at the bottom thereof, a secondary Imhoff type of tank having a clarifier compartment, a digester compartment, and a sludge slot at the bottom of the clarifier compartment through which solids which settle to the bottom of the clarifier compartment pass into the digester compartment, conduit means for directing the flow of supernatent liquid from the primary clarifier compartment to the inlet of the biological oxidizer tower, conduit means for directing the flow of sewage from the sump of the tower to the secondary clarifier compartment, conduit means for discharging the supernatent liquid from said secondary clarifier compartment, and means for delivering air to the secondary digester compartment for effecting aerobic digestion therein.

References Cited

UNITED STATES PATENTS

| | | | |
|---|---|---|---|
| 1,717,780 | 6/1929 | Imhoff | 210—195 |
| 2,254,953 | 9/1941 | Thomas | 210—15 X |
| 2,348,126 | 5/1944 | Green | 210—195 X |
| 2,574,685 | 11/1951 | Baxter et al. | 210—220 X |
| 2,779,730 | 1/1957 | Kelly et al. | 210—124 X |
| 2,901,114 | 8/1959 | Smith et al. | 210—202 X |
| 3,047,492 | 7/1962 | Gambrel | 210—15 X |
| 3,123,556 | 3/1964 | Gilbert | 210—260 X |
| 3,216,573 | 11/1965 | Irion | 210—220 |

FOREIGN PATENTS

| | | |
|---|---|---|
| 9,092 | 1913 | Great Britain. |
| 691,879 | 5/1953 | Great Britain. |

REUBEN FRIEDMAN, *Primary Examiner.*

D. M. RIESS, *Assistant Examiner.*